UNITED STATES PATENT OFFICE 2,539,478

METHOD OF DISPOSING OF SLOP OIL

Donald C. Roberson, Warrensville Heights, Ohio, assignor to The Standard Oil Company, Cleveland, Ohio, a corporation of Ohio No Drawing. Application July 8, 1946,
Serial No. 682,149

13 Claims. (Cl. 252—329)

The present invention relates to a method of disposing of refinery slop oil, and more particularly to the resolution of the interface emulsion formed in refinery slop oil.

Slop oil, as the term is used hereinafter in the specification and claims, is the aggregate of all oils, water and other liquids which accumulate in a refinery and include oil, water, acid and caustic along with a possible addition of heavier compounds such as asphalt, tar, coke, metallic solids, and mineral solids.

After free oil and free water has been separated from settled slop oil, an interface slop oil emulsion remains. It is a very stable emulsion and is often in a jelly-like state so viscous that if one were to poke one's finger into it, the depression made thereby would remain. No two samples of emulsion are exactly the same and in many cases a given sample becomes more stable upon standing. Microscopic analysis has revealed the emulsion to be of the internally dispersed, complex type wherein one or more oil globules are emulsified in larger globules of water which in turn are dispersed in an oil phase. The system in some instances may be just the reverse, i. e., water-in-oil-in-water. These phases are stabilized by solids, principally iron compounds such as ferrous sulfides and ferric oxide, as well as silicates, coke and finely divided carbon which accumulate from the refinery wastes. These solids are good stabilizing agents and prevent the emulsion from breaking, and are very often enclosed in the water globules enclosing smaller oil globules. The concentration of these solids in the various slop oil emulsions vary from 0.75 to 5% and average about 1.5%. The presence of these solids distinguishes slop oil emulsions from ordinary oil-water emulsions and greatly aggravates the problem of breaking the emulsions. In addition to the solid stabilizing agents, it is quite possible that there are some dissolved polar compounds in either the water or oil phase, or both, which also stabilize the emulsions.

The water phase in the slop oil emulsions may vary from 20 to 60%, but may go as high as 74%, and its pH usually varies from about 4 to approximately 8.5.

Although the separation of the slop oil emulsion into oil, water and solids appears quite simple from a theoretical point of view, in actual practice such operation has been extremely difficult. Ordinary separators have been found incapable of carrying out the required separation. The water separated out of the emulsion must have a sufficiently low content of oil to satisfy laws regulating the pollution of streams and other public disposal systems, and the oil recovered from such a separation must have a very low concentration of solids before it can be used effectively for most purposes.

Because substantially all of the oil must be removed or separated before the water can be sent into a sewer or river, it is the usual practice of refineries to run slop oil into large settling tanks. After the liquid stands in such a settling tank for some time, the slop oil becomes resolved into three phases or layers, the bottom layer being substantially free water, the top layer being substantially free oil and the intermediate layer being an interface emulsion of oil, solids and water. This emulsion is extremely stable and is very difficult to break by means of hitherto known processes. It is this interface emulsion that causes the disposal problems faced by refineries today. The breaking of slop oil emulsion has been very difficult, as well be seen from the discussion herein. Its accumulation requires storage tanks if it cannot be broken because it cannot be disposed of until broken. In some instances, the inability to break the emulsion when storage capacity is filled may even threaten the continued operation of a refinery.

Slop oil emulsion is a well known and well defined material in refinery operations. It is the resolution thereof into oil and water with which the present invention is specifically concerned.

Many methods have already been proposed for breaking and disposing of these interface emulsions which accumulate rapidly in refineries, but practically none have had any degree of success. Among the methods thus far proposed are coking, dehydration, centrifuging, filtration, heating, burning and chemical treatment of the interface emulsion as well as various combinations of such methods.

Coking of the interface emulsion has failed to dispose of the problem because the emulsions contain a high proportion of dirt and the other solids mentioned previously, which accumulate in the bottom of the still and insulate it. As a result, further continued operation causes the bottom of the still to warp. The coke obtained thereby is of no value because it contains so much dirt that it will not burn.

Another proposed method of disposing of the troublesome interface emulsion is by thermal dehydration in an attempt to boil off the water. This method is uneconomical, however, because of the large quantity of fuel required to supply the very considerable heat of vaporization necessary to boil off the water completely. In addition, a considerable amount of bottom sediment drops to the bottom of the dehydration vessel and accumulates there to form an insulating layer. This makes it necessary to clean the vessel completely after processing only three or four charges of slop oil. These factors, together with the experience that dehydration utilizes a great deal of valuable equipment and is apt to cause damage thereto by warping, makes the dehydration process commercially unfeasible.

A third method proposed is to centrifuge the emulsion to separate the solids. It was found, however, that the oils contained in the emulsion are usually so heavy and that their specific gravity is so high and so close to that of water, that there is little separation of oil and water by centrifugal forces. The separation and removal of the solids, however, sometimes causes some separation of the oil and water phases. The method is very expensive, however, because the volumes of slop oil to be disposed of are very large and the maintenance costs of centrifuges are very high.

Still another proposed method of disposing of slop oil involves filtration. This, however, is a very messy operation. Heavy oils gum up the filter and at best the filtration operation does not remove all stabilizing agents and, particularly, the colloidal solids.

It has also been attempted to dispose of slop oil by simply heating the emulsion to temperatures of about 175° F. and maintaining said temperature for periods of from four to five days. This method sometimes brings about the separation of about 40% of the emulsion into two phases, but the remaining 60% is an even tighter emulsion which is still more difficult to dispose of. Furthermore, this process requires too much time and is extremely wasteful of heat. The amount of slop oil produced in the refining of crude oil in many cases is surprisingly large, and it can easily be realized that the time, space and heat requirements of this proposed method rule it out as an unsatisfactory expedient.

Another proposed method of disposing of slop oil is that of burning the emulsion by spraying it out of a nozzle. Experience has shown, however, that the high solid content of the slop oil emulsion clogs up the nozzle and makes it difficult to spray. Furthermore, the heating value of a slop oil emulsion is extremely doubtful, the equipment would have to be extremely flexible to take into account the variations in the constitution of the slop oil emulsions, and would require the installation of new and expensive equipment in the form of waste-heat boilers.

The chemical treating methods heretofore proposed have resolved the emulsion only to a smaller extent and the emulsion remaining after the treatment was even tighter so that it could not be recycled in the resolving processes, thus bringing about an accumulation of very tight emulsions that cannot be resolved by known chemical processes. In addition, the emulsions to be disposed of vary, and have required different treating agents. Consequently no universal process suitable for a wide variety of slop oils has thus far been developed satisfactorily. Most of the chemical treating methods hitherto suggested are suitable for simple emulsions only and are of little value for treating complex emulsions such as slop oil emulsions.

In the past, refineries have in desperation tried all of the foregoing methods and have generally been forced to use some combination thereof. Thus, for example, some refineries heat the slop oil to reduce the volume as much as possible, then boil it to boil off as much water as possible and finally subject the remainder to centrifuging or coking.

It is the primary object of the present invention to provide a process by means of which the interface emulsions of slop oil can be resolved efficiently into recoverable oil and disposable water. This and further objects will become apparent from the specification that follows hereinafter.

It has now been found that refinery slop oil can be effectively disposed of, and the interface emulsion formed thereby can be efficiently resolved into oil and disposable water containing the solids by treating the emulsion with a surface active agent and a pH altering agent producing unequal molar concentrations of hydrogen and hydroxyl ions in aqueous solutions. By this means, substantially all of the oil in the emulsion is recovered in a form having a small amount of solids and water, and the water and solids in the emulsion are separated out with a minimum concentration of oil therein sufficiently low to make legally possible their disposal to river or lake-water, or to a public sewerage system.

As the surface active agent, any such known agent may be employed. A representative list of such agents is disclosed in Industrial and Engineering Chemistry for January, 1943 at page 126 et seq. These vary somewhat in effectiveness but it has been found that organic sulfates and sulfonates are usually the most desirable. Sulfonated oils, such as sulfonated vegetable, animal, and mineral oils, as well as sulfonated esters of polyhydric and monohydric alcohols, and sulfonated oxygen-bearing compounds, have been found particularly efficacious. These surface active agents may be added to the slop oil in any desired form such as, for example, in the form of a solution of the surface active agent in an oil stock, including slop oil, or in water. The amount of surface active agent to be added to a batch of slop oil emulsion to be treated varies, depending upon the conditions, but generally it has been found that the addition of surface active agents in small concentrations, i. e., about 0.001% to 2.0% of the emulsion, such as approximately 1% by volume of a solution containing from about 5 to about 20% surface active agent, is sufficient for the purpose.

It has been found desirable, although not necessary, to add the surface active agent in the form of a solution of oil when the external phase of the slop oil emulsion is an oil phase because the oil acts not only as a solvent for the surface active agent but also as a carrier to bring the agent into better contact with the various phases of the emulsion. For the same reason, it is desirable, although not necessary, to add the surface active agent in the form of a solution in water when the external phase of the slop oil emulsion is a water phase. Sulfonated neat's-foot oil and a sulfonated vegetable oil containing 4% by weight of sulfonated fatty alcohol have been found particularly efficient as surface active agents.

The term "agent producing unequal molar concentrations of hydrogen and hydroxyl ions in aqueous solutions," as used hereinafter in the specification and claims, is intended to cover any ionic agent, i. e., an acid or a base, capable of altering the measurable pH of the emulsion. In view of the economics involved, the invention will generally be practiced with the well-known mineral acids, such as sulfuric acid, hydrochloric acid and nitric acid, as well as the well-known inorganic bases, such as sodium carbonate, sodium hydroxide, potassium carbonate, potassium hydroxide, lithium hydroxide, lime and the like.

Depending upon conditions hereinafter described, treatment of the interface emulsion with a surface active agent may be followed by successive treatments with alkali and acid, acid and alkali, or acid or alkali alone.

The alkali may be added in any desired form in carrying out the present invention. Aqueous solutions of sodium carbonate having a concentration of about 10 to 25% alkali have, for example, been found to be quite effective. Relatively small concentrations of alkali, i. e., 0.1 to 2%, such as 1% by volume to the slop oil to be treated, of a 20% aqueous solution of sodium carbonate are generally sufficient.

The acid may likewise be added in any desired form in accordance with this invention. Thus, for example, concentrated sulfuric acid or spent alkylation acid may be used. It has been found that the addition of 0.1 to about 2% by volume of concentrated sulfuric acid, or spent alkylation acid, to the slop oil emulsion is sufficient for the purposes of this process.

The first step of the process comprises the addition of the surface active agent preferably while agitating the emulsion. Sometimes this addition of surface active agent destroys the jelly structure of the emulsion and causes its viscosity to reduce so as to take on more of the characteristics of a liquid. At other times the addition of the surface active agent has no visible effect upon the emulsion. This difference in effect appears to depend upon the pH of the water phase of the emulsion.

When the addition of the surface active agent produces no visible effect upon the emulsion, the alkali is added while agitating the emulsion. Following this, the acid is added, likewise with agitation. In some cases, the steps are reversed, i. e., the acid added first and the alkali second. Upon settling, the emulsion then separates into two layers, the top layer being an oil layer and the other layer containing a sufficient low concentration of oil to make it legally disposable into a sewer, river or lake. Sometimes, a third, intermediate layer, usually of very minor proportion by volume, and comprising unbroken emulsion, also remains. Any such interface emulsion which remains may be included with the subsequent treatments. Tests have shown that this interface emulsion will reach a maximum in repeated or continuous operations, and that this maximum ordinarily does not exceed 5% by volume of the charge capacity.

In the foregoing three-stage process, the addition of the alkali or acid in the second stage is accompanied by a distinct decrease in the viscosity of the emulsion, and in some cases resolves appreciable quantities of free oil and water. Quite often, however, the decrease in viscosity is not accompanied by any signs of a break in the emulsion. Upon the addition of acid or alkali in the third stage, however, the emulsion invariably breaks. When alkali is added in the second stage and acid is added in the third stage, the pH of the aqueous phase is generally in the range of 1 to 3.5, usually 1.5 to 2.0.

When the three-stage method is used, there need not be any intermediate settling between the addition of the alkali and the acid. Depending upon the space requirements and other relative factors, the treated emulsion may be allowed to settle for any desired period of time after the addition of surface active agent, alkali or acid intermediate any of the stages of the two- or three-stage process. On the other hand, it is entirely feasible to eliminate settling between any of the various stages.

When the addition in the first stage of surface active agent to the slop oil emulsion causes a distinct lowering of the viscosity, the two-stage process may generally be used. In this process, the second stage consists of the addition of either acid or alkali accompanied by agitation and followed by settling. If the pH of the water phase of the emulsion is initially on the alkaline side, the addition of acid usually brings about a breaking of the emulsion into distinct oil and water phases. If the pH of the water phase of the emulsion is on the acid side, the addition of alkali alone, while agitating, followed by settling, likewise breaks the emulsion into distinct oil and water phases.

When carrying out the process described above, the emulsion may be maintained at a temperature between about 60° and 200° F. Generally, however, temperatures of between about 125° and 180° F. have been found most suitable. In view of the presence of a surface active agent, it is surprising that the agitation of the emulsion, after the addition of alkali and/or acid, does not further tighten the emulsion. Experience has shown, for example, that the centrifuging of slop oil emulsions usually results in an emulsion which is much more difficult to break and would, consequently, lead one to believe that agitation thereof should be avoided in any effort to break the emulsion.

Although the present invention is not limited to any particular theory of operation, it is believed that the complex emulsion of oil, water and solid particles may or may not be resolved into a simple emulsion upon the addition of the surface active agent, depending upon whether the system happens to be at the pH where it is least stable. If the emulsion happens to be at such a pH where it can be partially resolved by the addition of the surface active agent, a change in viscosity will result. If this viscosity change does not appear, the complex emulsion remains and must be resolved into a simple emulsion by the addition of a small amount of alkali or acid so that this system passes through the pH of minimum stability. Agitation during the addition of the alkali or acid resolves the complex emulsion to a simple emulsion as it passes through the pH of minimum stability. In most instances the simple emulsion is least stable on the acid side and requires the addition of acid in an amount sufficient to carry the system through the pH of minimum stability for the simple solution. When this is accomplished, the emulsion breaks more or less completely and free oil and water are obtained.

Although the present invention is not to be limited specifically thereto, it is further illustrated by the following examples:

*Example I*

One liter of fresh slop oil emulsion, containing 55% B. S. & W. (bottom sediment and water) and no free oil or free water was heated to 190°

F. and 0.8% by volume of a 20% oil solution of sulfonated neat's-foot oil was added during agitation. The mixture was then allowed to settle for 7 hours at a temperature of 170° to 180° F., whereafter 365 cc. of free oil was removed from the top thereof. To the remaining emulsion there was added while agitating 0.5% by volume of concentrated sulfuric acid. This was allowed to settle for 36 hours at 160° F. whereupon it was possible to remove separately, 90 cc. of free oil and 413 cc. of free water.

By means of the foregoing process, 87% of the emulsion was resolved, 46% of the total emulsion being resolved into free oil, 41% of the total emulsion being resolved into free disposable water, and the amount of interface emulsion was reduced to 11% of the former volume. This interface emulsion can be later subjected to similar treatment with the next batch, and represents a substantial amount of interface emulsion resolved per pass. When recycled, this emulsion will be resolved and does not accumulate to form a residue of an unbreakable emulsion.

*Example II*

Forty gallons of fresh slop oil emulsion having a B. S. & W. content of 60% with no free oil or free water present, were heated to 190° F. and one percent by volume of a 20% oil solution of sulfonated neat's-foot oil was added during agitation. There was no visible break in the emulsion. One percent by volume of concentrated sulfuric acid was added while agitating the emulsion. After settling at 160° F. for 36 hours, the emulsion was resolved into a free oil phase of 40% by volume, which based on the B. S. & W. analysis, shows a complete resolution of the emulsion.

*Example III*

To four liters of fresh slop oil emulsion having a B. S. & W. of 40% and no free oil or free water, there were added, successively, at two minute intervals with agitation at 125° F., 1% by volume of a 5% oil solution of a sulfonated vegetable oil, 1% by volume of a 20% aqueous solution of sodium carbonate and 1% by volume of an 88% sulfuric acid solution (spent alkylation acid). Agitation was continued for 5 minutes at 125° F. After 14 hours of settling, the emulsion was resolved into three distinct layers, the top layer being free oil and comprising 58% of the volume, the bottom layer being free water and comprising 38% by volume and an intermediate layer of unresolved interface emulsion of 2% by volume.

*Example IV*

Forty-five gallons of fresh slop oil emulsion having a B. S. & W. of 45% and no free oil or free water was treated as in Example III, but with technical grade sulfuric acid. After 5 minutes of agitation and settling, the emulsion was resolved into a free oil phase of 53%, by volume. Based on the B. S. & W. analysis, the process liberated substantially all of the oil in the emulsion.

Where the sum of the products obtained in accordance with the foregoing examples do not add up to 100% by volume of the original slop oil emulsion treated, the slight discrepancies are due to the evaporation of water, the packing of the emulsion and to experimental error.

Since many widely differing embodiments of the invention may be made without departing from the invention, it is to be understood that such modifications that come within the spirit of the invention herein disclosed are intended to be included within the scope of the following claims.

I claim:

1. A method of resolving the interface emulsion of slop oil having an external oil phase which comprises treating said emulsion at a temperature of at least 125° F. successively with a surface active compound selected from the group consisting of sulfated and sulfonated organic surface active agents and an agent producing unequal molar concentrations of hydrogen and hydroxyl ions in aqueous solutions, said agent being added in an amount, when it is an acid, sufficient to product a molar concentration of hydrogen ions equivalent to that produced by an addition of 0.1 to 2% by volume, based on the volume of the interface emulsion treated, of concentrated sulfuric acid and, when it is a base, sufficient to produce a molar concentration of hydroxyl ions equivalent to that produced by an addition of 0.1 to 2% by volume, based on the volume of the interface emulsion treated, of a 20% aqueous solution of sodium carbonate.

2. A method of resolving the interface emulsion of slop oil having an external oil phase which comprises treating said emulsion at a temperature of at least 125° F. with a surface active compound selected from the group consisting of sulfated and sulfonated organic surface active agents and then agitating successively with a plurality of agents producing unequal molar concentrations of hydrogen and hydroxyl ions in aqueous solutions, one of said agents being an acid and another of said agents being a base, the amount of acid added being sufficient to produce a molar concentration of hydrogen ions equivalent to that produced by an addition of 0.1 to 2% by volume, based on the volume of the interface emulsion treated, of concentrated sulfuric acid, and the amount of base added being sufficient to produce a molar concentration of hydroxyl ions equivalent to that produced by an addition of 0.1 to 2% by volume, based on the volume of the interface emulsion treated, of a 20% aqueous solution of sodium carbonate.

3. The method defined in claim 2 wherein the emulsion is treated successively with a surface active compound, a base, and an acid.

4. The method defined in claim 2 wherein the emulsion is treated at a temperature of about 180° F. successively with a surface active compound, a base, and an acid.

5. The method defined in claim 2 wherein the emulsion is treated successively with a surface active compound, an acid, and a base.

6. The method defined in claim 2 wherein the emulsion is treated at a temperature of about 180° F. successively with a surface active compound, an acid, and a base.

7. The method defined in claim 1 wherein an emulsion having a pH above 7 in the water phase is treated successively with a surface active agent and with an acid.

8. The method defined in claim 1 wherein an emulsion having a pH above 7 in the water phase is treated successively with a surface active agent and with from 0.1 to 2% by volume, based on the volume of the interface emulsion treated, of concentrated sulfuric acid.

9. The method defined in claim 1 wherein an emulsion having a pH below 7 in the water phase is treated successively with a surface active agent and with a base.

10. The method defined in claim 1 wherein an emulsion having a pH below 7 in the water phase is treated successively with a surface active agent and with from 0.1 to 2% by volume, based on the volume of the interface emulsion treated, of a 20% aqueous solution of sodium carbonate.

11. The method defined in claim 2 wherein the emulsion is treated successively with sulfonated neat's-foot oil, a base, and an acid.

12. The method defined in claim 2 wherein the emulsion is treated successively with sulfonated animal oil, a base, and an acid.

13. A method of resolving the interface emulsion of slop oil having an external oil phase which comprises treating said emulsion at a temperature of at least 125° F. successively with a surface active compound selected from the group consisting of sulfated and sulfonated organic surface active agents and then agitating successively with amounts, each within the range of 0.1 to 2% by volume, of a plurality of agents producing unequal molar concentrations of hydrogen and hydroxyl ions in aqueous solutions, one of said agents being sulfuric acid and another of said agents being an aqueous solution of sodium carbonate, said amounts of said agents causing the emulsion to pass through the pH of substantially minimum stability.

DONALD C. ROBERSON.

REFERENCES CITED

The following references are of record in the file of this patent:

UNITED STATES PATENTS

| Number | Name | Date |
|---|---|---|
| 1,643,699 | Coggleshall et al. | Sept. 27, 1927 |
| 1,742,648 | Coggleshall et al. | Jan. 7, 1930 |
| 2,015,260 | De Groote | Sept. 24, 1935 |
| 2,175,818 | Stryker | Oct. 10, 1939 |
| 2,217,387 | Shapiro | Oct. 8, 1940 |